(12) United States Patent
Scherer et al.

(10) Patent No.: US 10,712,258 B2
(45) Date of Patent: Jul. 14, 2020

(54) CUVETTE HAVING HIGH OPTICAL TRANSMISSIVITY AND METHOD OF FORMING

(71) Applicant: California Institute of Technology, Pasadena, CA (US)

(72) Inventors: Axel Scherer, Barnard, VT (US); Amirhossein Nateghi, Pasadena, CA (US); Taeyoon Jeon, Pasadena, CA (US); Frank T. Hartley, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 35 days.

(21) Appl. No.: 16/212,347

(22) Filed: Dec. 6, 2018

(65) Prior Publication Data

US 2019/0170633 A1    Jun. 6, 2019

Related U.S. Application Data

(60) Provisional application No. 62/595,362, filed on Dec. 6, 2017.

(51) Int. Cl.
*G01N 1/42* (2006.01)
*G01N 21/03* (2006.01)
(Continued)

(52) U.S. Cl.
CPC ........... *G01N 21/0303* (2013.01); *G01N 1/42* (2013.01); *G01N 1/44* (2013.01); *G01N 21/171* (2013.01);
(Continued)

(58) Field of Classification Search
CPC .... G01N 1/42; G01N 1/44; G01N 2021/6439; G01N 2021/9583; G01N 21/0303;
(Continued)

(56) References Cited

U.S. PATENT DOCUMENTS

| 4,886,358 A | 12/1989 | Pellenbarg et al. |
| 5,408,562 A * | 4/1995 | Yoshizawa ........... G02B 6/4408 385/110 |

(Continued)

OTHER PUBLICATIONS

Authorized Officer Blaine R. Copenheaver, International Search Report and Written Opinion issued in International PCT Application No. PCT/US2018/064340 and dated Jan. 31, 2019.

*Primary Examiner* — Michael P Stafira
(74) *Attorney, Agent, or Firm* — Kaplan Breyer Schwarz, LLP

(57) ABSTRACT

The present disclosure is directed toward a cuvette for holding a test sample during optical interrogation with a light signal. The transmissivity of the cuvette is increased by a geometric anti-reflection layer disposed on at least one surface of the cuvette, where the geometric anti-reflection layer includes a plurality of geometric features that collectively reduce the reflectivity of the interface between the surface and another medium. As a result, more of the interrogation signal passes through the interface. In some embodiments, every surface through which the interrogation signal passes includes a geometric anti-reflection layer. Due to the increased transmissivity of the cuvette, light detected after passing through it can have an improved signal-to-noise ratio and/or the light signal used to interrogate the sample can have lower intensity. In addition, the reduction of the reflectivity of each surface enables the use of low-cost, high-refractive-index materials, such as conventional silicon.

25 Claims, 8 Drawing Sheets

(51) Int. Cl.
*G01N 1/44* (2006.01)
*G01N 21/17* (2006.01)
*G01N 21/25* (2006.01)
*G01N 21/35* (2014.01)
*G01N 21/3504* (2014.01)
*G01N 21/3577* (2014.01)

(52) U.S. Cl.
CPC ........... *G01N 21/255* (2013.01); *G01N 21/35* (2013.01); *G01N 21/3504* (2013.01); *G01N 21/3577* (2013.01)

(58) Field of Classification Search
CPC .... G01N 21/171; G01N 21/255; G01N 21/35; G01N 21/3504; G01N 21/3577; G01N 21/6428; G01N 21/645; G01N 21/8803; G01N 2201/06113; G01N 33/54366; G01N 33/54373; G02B 6/44; G02B 6/3616; G02B 6/3807; G02B 6/3809; G02B 6/381; G02B 6/387; G02B 6/3879; G02B 6/3893; G02B 6/02342; G02B 6/02395; G02B 6/4433; G02B 6/022; G02B 6/4429; G01D 5/35361; G01D 5/35364; G01D 11/245; G01D 5/35303; G01D 5/35374; G01K 11/32; G01K 2011/322; G01L 1/242; G01L 11/02; G01L 11/025; G01L 1/24; G01B 11/16
See application file for complete search history.

(56) References Cited

U.S. PATENT DOCUMENTS

| | | | |
|---|---|---|---|
| 6,488,892 | B1 | 12/2002 | Burton et al. |
| 8,323,466 | B2 | 12/2012 | Kim et al. |
| 2005/0229696 | A1* | 10/2005 | Takayama ............. B01F 5/0646 73/204.26 |
| 2005/0239211 | A1 | 10/2005 | Uchihara et al. |
| 2010/0112373 | A1* | 5/2010 | Coffey .................... B32B 33/00 428/608 |
| 2012/0111104 | A1* | 5/2012 | Taverner ................ G01H 9/004 73/152.16 |
| 2012/0199742 | A1 | 8/2012 | Wagner et al. |
| 2012/0287418 | A1 | 11/2012 | Scherer et al. |
| 2013/0107254 | A1 | 5/2013 | Yu et al. |
| 2015/0211900 | A1* | 7/2015 | Xue ......................... B01J 19/00 356/73.1 |
| 2015/0268433 | A1* | 9/2015 | Stratton ............... G02B 6/4416 385/101 |
| 2016/0116308 | A1* | 4/2016 | Xue ......................... G01L 1/242 385/12 |

* cited by examiner

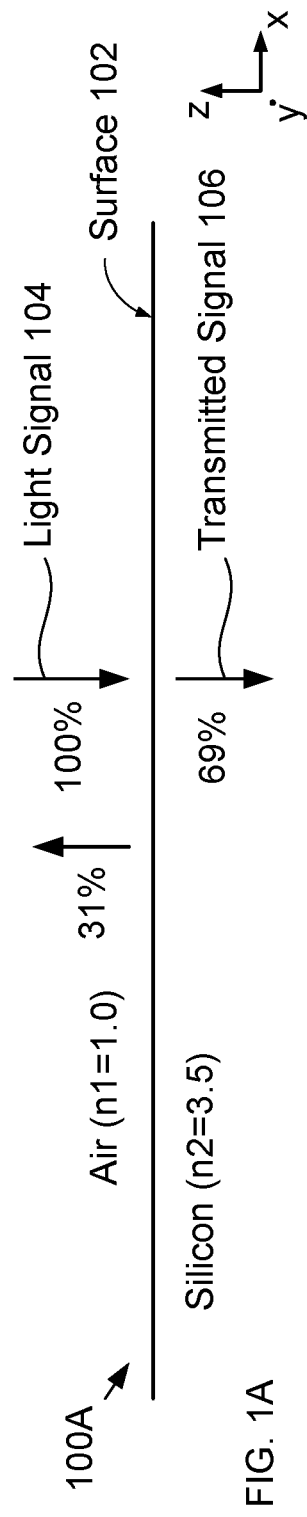
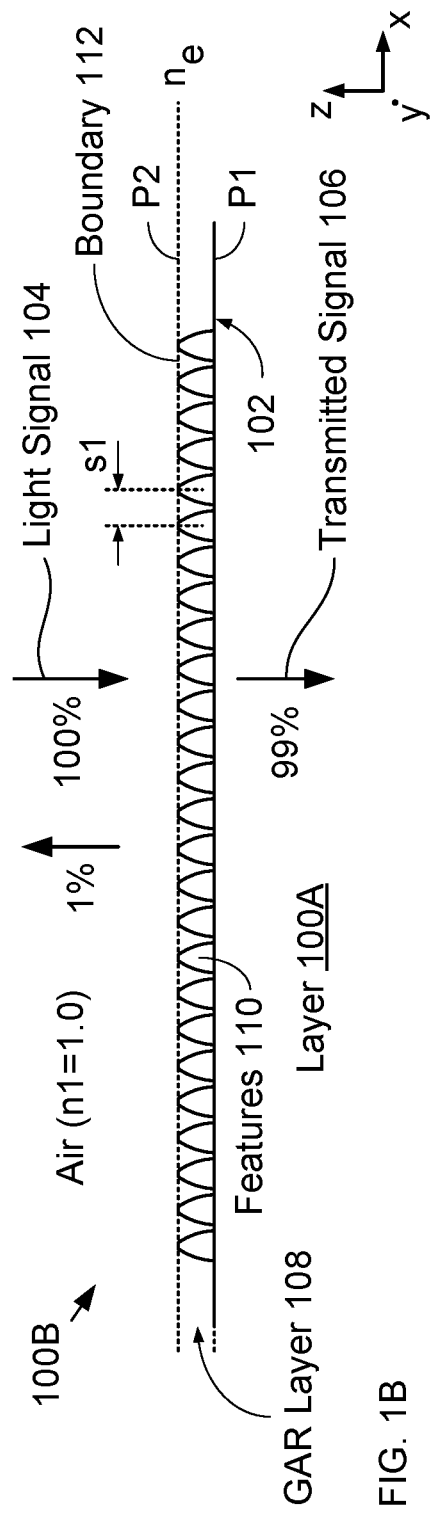
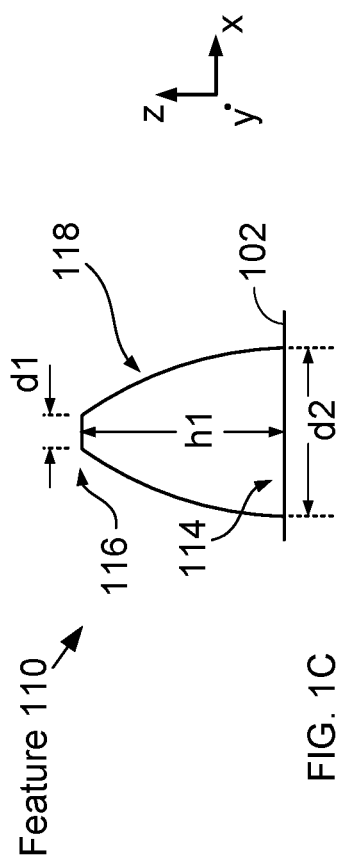
FIG. 1A
FIG. 1B
FIG. 1C

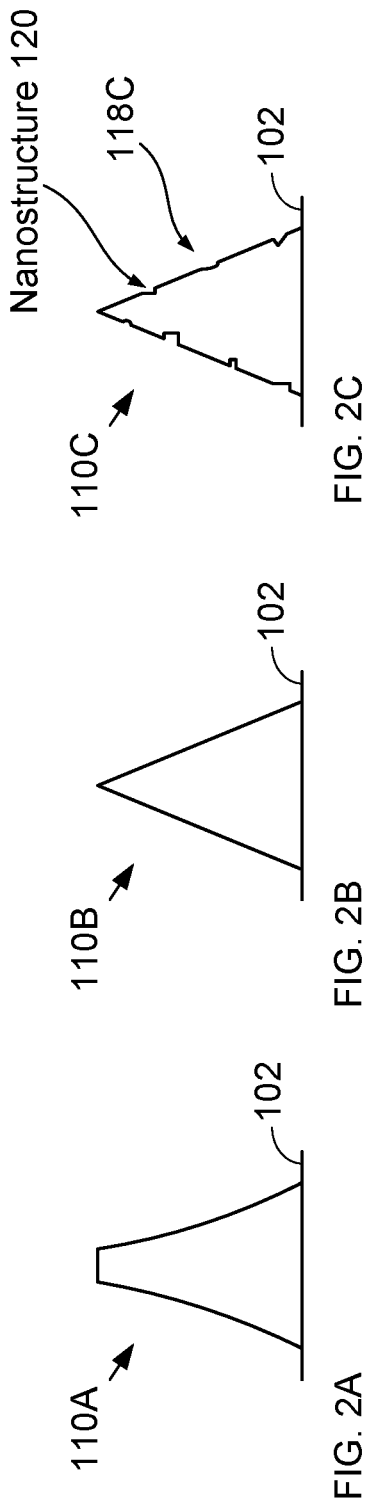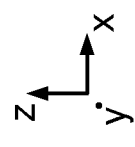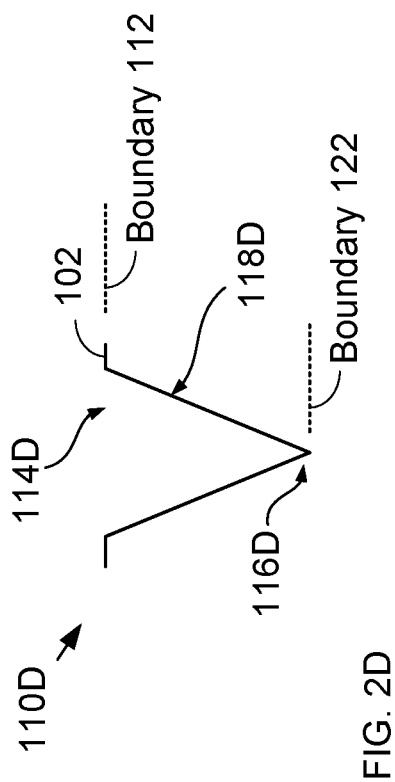

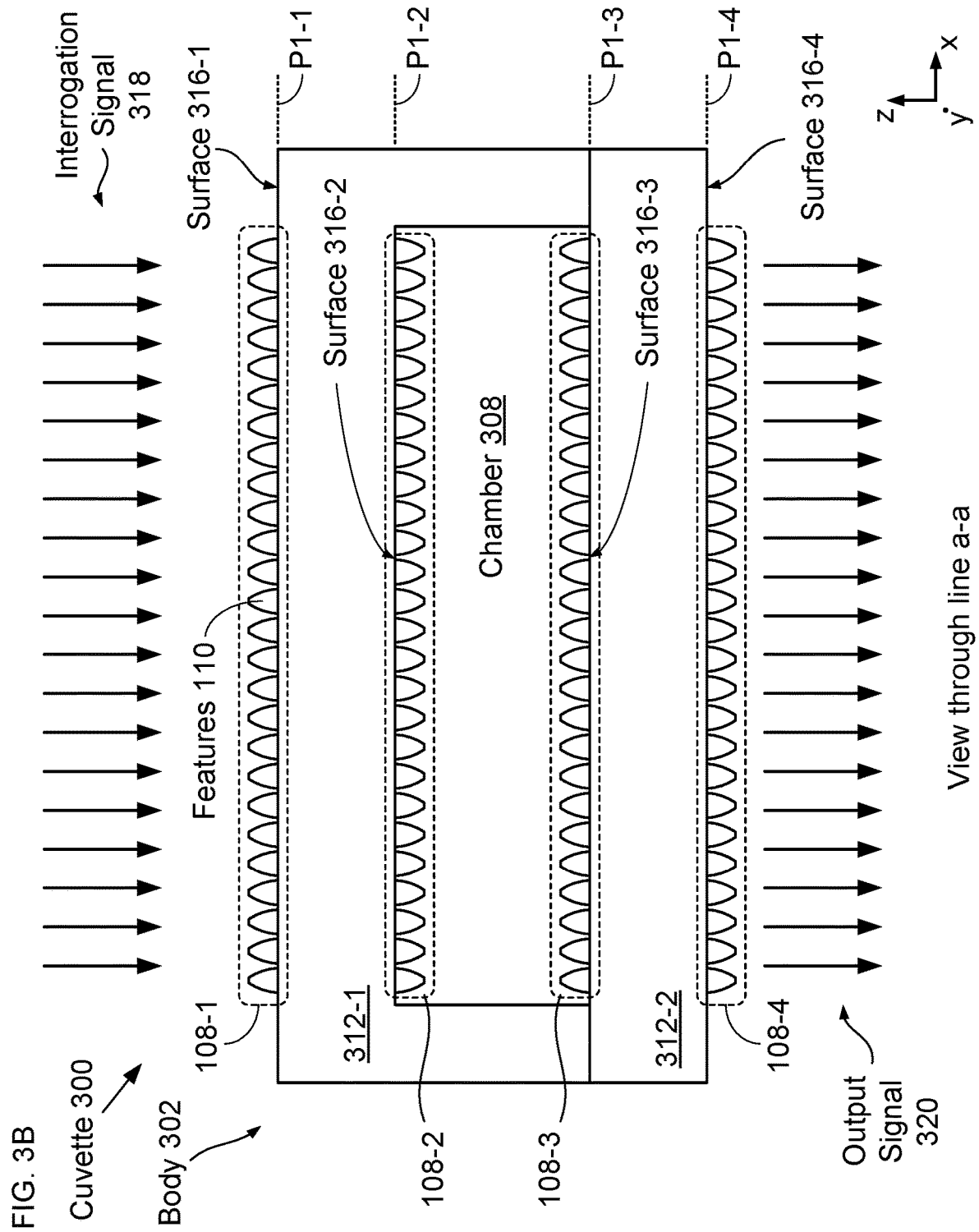

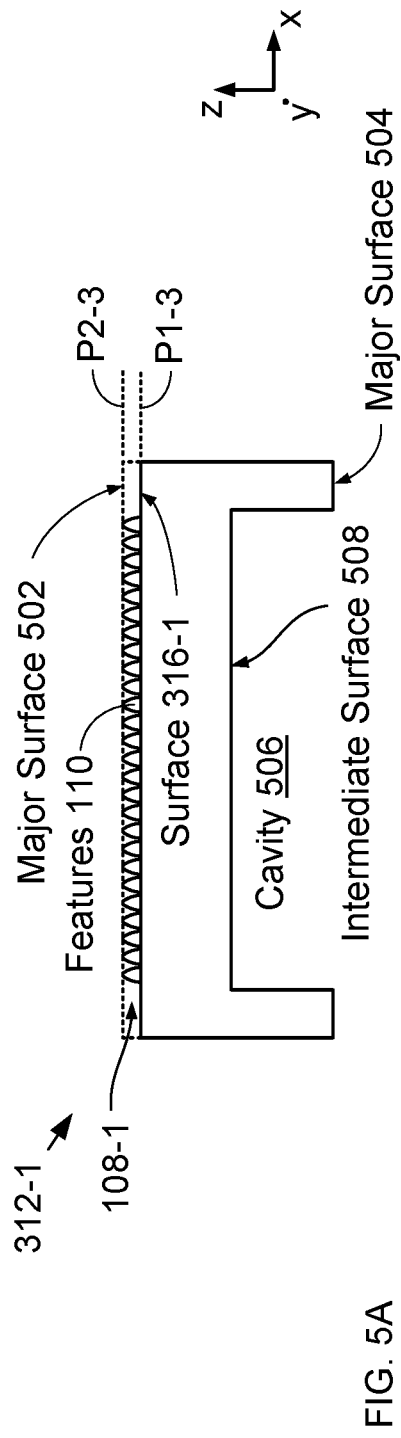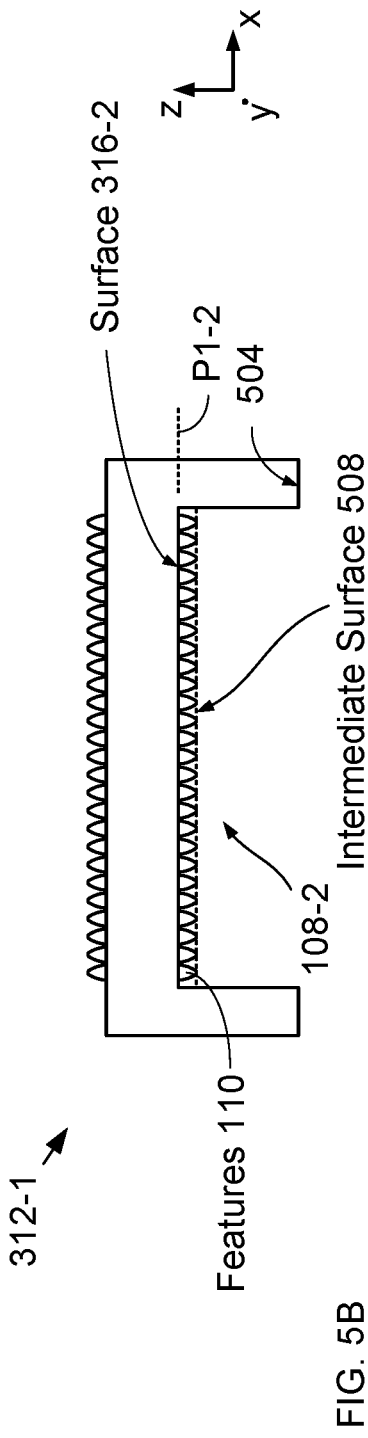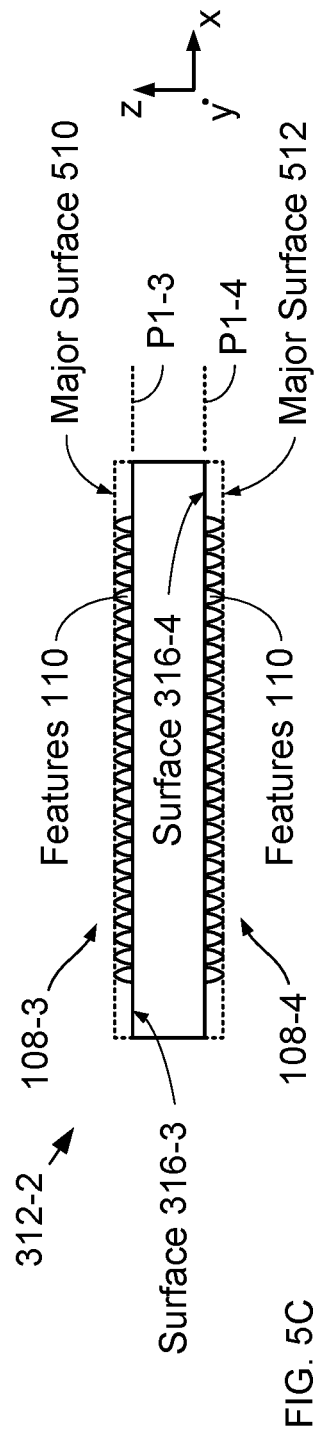

CUVETTE HAVING HIGH OPTICAL TRANSMISSIVITY AND METHOD OF FORMING

CROSS REFERENCE TO RELATED APPLICATIONS

This case claims priority of U.S. Provisional Patent Application Ser. No. 62/595,362, filed Dec. 6, 2017, which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates generally to optical analysis of a test sample and, more particularly, to sample holders suitable for use in optical analysis systems such as infrared spectrometers, mid-infrared spectrometers, and the like.

BACKGROUND OF THE INVENTION

During optical analysis of a test sample, the sample is often held in a sample chamber of a cuvette—particularly when the test sample is a fluid or fluid-like substance. As a result, at least a portion of the cuvette must be at least somewhat transparent for the wavelengths included in the light signal used to interrogate the sample (i.e., the interrogation signal).

For a variety of reasons, it is often desirable to use a low-intensity interrogation signal. To enable an output signal with high signal-to-noise ratio, therefore, materials used in prior-art cuvettes are normally low-refractive-index materials, such as glasses, plastics, calcium fluoride, and the like, which mitigates the amount of optical energy lost in transiting the cuvette itself.

Unfortunately, such materials can be inappropriate for use with some test samples, due to interaction between the cuvette material and the test sample, chemical incompatibility, etc. For more exotic materials, such as calcium fluoride, material cost becomes a significant disadvantage in some applications.

Furthermore, many optical analysis techniques are preferably performed using interrogation signals having wavelengths for which typical cuvette materials are not suitable. Mid-infrared spectroscopy, for example, employs interrogation signals having wavelengths within the range of 2 microns to 15 microns, over which the transmissivity of common cuvette materials is poor.

The need for a cuvette comprising common, low-cost materials that can be configured to have high transmissivity for the spectral content of any of a wide range of interrogation signals remains, as yet, unmet in the prior art.

SUMMARY OF THE INVENTION

The present disclosure is directed toward a cuvette for holding a test sample, lens or other optical element in the beam path of a spectrometer and enabling its interaction with an optical interrogation signal. The reflectivity of at least one surface of the cuvette or other optical element for the interrogation signal is reduced by including a plurality of features at the surface, where the features collectively define a geometric antireflection layer. The features are configured such that the effective refractive index of the geometric antireflection layer slowly transitions adiabatically from a relatively lower refractive index at its outer boundary to a relatively higher refractive index where they meet the surface on which they are disposed, where the higher refractive index is typically the bulk refractive index of the material of the surface. Embodiments of the present invention are particularly well suited for use in spectroscopy systems, such as mid-infrared spectrometers.

Like cuvettes known in the prior art, a cuvette in accordance with the present disclosure comprises a material that is at least partially transmissive for an interrogation signal such that a test sample in a sample chamber within the cuvette can be exposed to the interrogation signal. Typically, however, the materials used in prior-art cuvettes must have low refractive indices to mitigate reflectivity at all surfaces in the path of the interrogation and output signals. As a result, only a limited set of materials, such as glass, plastic, or exotic materials (e.g., calcium fluoride, etc.) can typically be used in a prior-art cuvette. In some prior-art cuvettes, multi-layer dielectric coatings are employed as anti-reflection layers at one or more of these surfaces. Unfortunately, such multi-layer dielectric coatings typically only reduce the reflectivity of its corresponding surface over a very narrow wavelength range.

In sharp contrast to the prior art, cuvettes in accordance with the present invention have higher transmittance for an interrogation signal by virtue of a geometric anti-reflection layer included at one or more surfaces of the cuvette. The geometric anti-reflection layer includes a plurality of features located at the surface, where the spacing of the features is less than the wavelengths of light in the interrogation signal, and where the features collectively suppress reflections at an interface between the surface and a medium (e.g., air, the test sample, etc.) such that more light of the interrogation signal can pass through the interface. A geometric anti-reflection layer in accordance with the present disclosure can reduce the reflectivity of the surface on which it is disposed over a significantly wider spectral range than an anti-reflection coating of the prior art. Furthermore, they can be coupled with surfaces that comprise materials having higher refractive indices than are typically desirable in prior-art cuvettes. Cuvettes in accordance with the present disclosure provide particular advantages when used in a system that operates in the mid-infrared spectral range.

An illustrative embodiment in accordance with the present disclosure is a silicon-based cuvette suitable for use in mid-infrared spectroscopy, where the cuvette has a sample chamber that resides within its body. The body is formed by joining two silicon substrates, one of which includes a cavity recessed from one of its surfaces. At each surface of the cuvette through which the mid-infrared interrogation signal passes, a geometric anti-reflection layer is formed by etching into the bulk material of the substrate back to define a plurality of features having a cross-section that increases non-linearly from a relatively small-diameter tip to a broad base at a second, new surface. The features are spaced apart over the second surface by a distance that is less than the shortest wavelength of light included in the interrogation signal. The features are configured such that the total aggregate surface area normal to the interrogation signal is very small, thereby mitigating back-reflections of the signal.

In some embodiments, the features have a cross-section that increases linearly from their tip to their base. In some embodiments, the features are formed by disposing material on the surface, for example, via selective-area growth, self-assembly, the Langmuir-Blodgett method, and the like.

In some embodiments, the sidewalls of one or more of the features are roughened by forming nanostructure in its surface via a nano-structuring method such as electrochemical etching, ion-assisted etching, etc.

In some embodiments, the body of the cuvette comprises two substrates made of different materials.

In some embodiments, at least one surface of the cuvette through which the interrogation signal passes does not include a geometric anti-reflection layer.

An embodiment in accordance with the present disclosure is a cuvette comprising a body having: a first wall having a first surface that defines a first plane and a second surface that defines a second plane, wherein the first surface comprises a first material; a second wall having a third surface that defines a third plane and a fourth surface that defines a fourth plane; and a first plurality of features that collectively define a first geometric anti-reflection layer, each feature extending from a first base at the first plane to a tip; wherein the second surface and third surface define at least a portion of a chamber for holding a test sample; wherein a flat surface comprising the first material is characterized by a first reflectivity for a first light signal; and wherein the first geometric anti-reflection layer and the first surface are collectively characterized by a second reflectivity for the first light signal that is lower than the first reflectivity.

Another embodiment in accordance with the present disclosure is a method for forming a cuvette, the method comprising: providing a first substrate having a first surface that defines a first plane and a second surface that defines a second plane; providing a second substrate having a third surface that defines a third plane and a fourth surface that defines a fourth plane; forming a first geometric anti-reflection layer that includes a first plurality of features disposed on the first surface such that each of the first plurality of features extends from a first base at the first plane to a tip, wherein the first surface comprises a first material, and wherein a flat surface comprising the first material is characterized by a first reflectivity for a first light signal, and further wherein the first geometric anti-reflection layer and the first surface are collectively characterized by a second reflectivity for the first light signal that is lower than the first reflectivity; and arranging the first substrate and a second substrate such that a second surface and a third surface collectively define at least a portion of a chamber for holding a test sample.

BRIEF DESCRIPTION OF THE DRAWINGS

FIG. 1A depicts a schematic drawing of the transmission characteristics of a light signal incident on a flat interface between air and a silicon layer.

FIG. 1B depicts a schematic drawing of the transmission characteristics of a light signal incident on a non-flat interface between air and silicon where the interface comprises a geometric anti-reflection layer in accordance with the present disclosure.

FIG. 1C depicts a schematic drawing of a cross-sectional view of an exemplary feature 110 in accordance with the present disclosure.

FIGS. 2A-D depict schematic drawings of cross-sectional views of several non-limiting examples of feature shapes in accordance with the present disclosure.

FIGS. 3A-B depict schematic drawings of simplified perspective and sectional views, respectively, of an illustrative embodiment of a cuvette in accordance with the present disclosure.

FIGS. 5A-C depict cross-sectional views of substrates 312-1 and 312-2 at different points in the formation of cuvette 300.

DETAILED DESCRIPTION

Figure 3A:
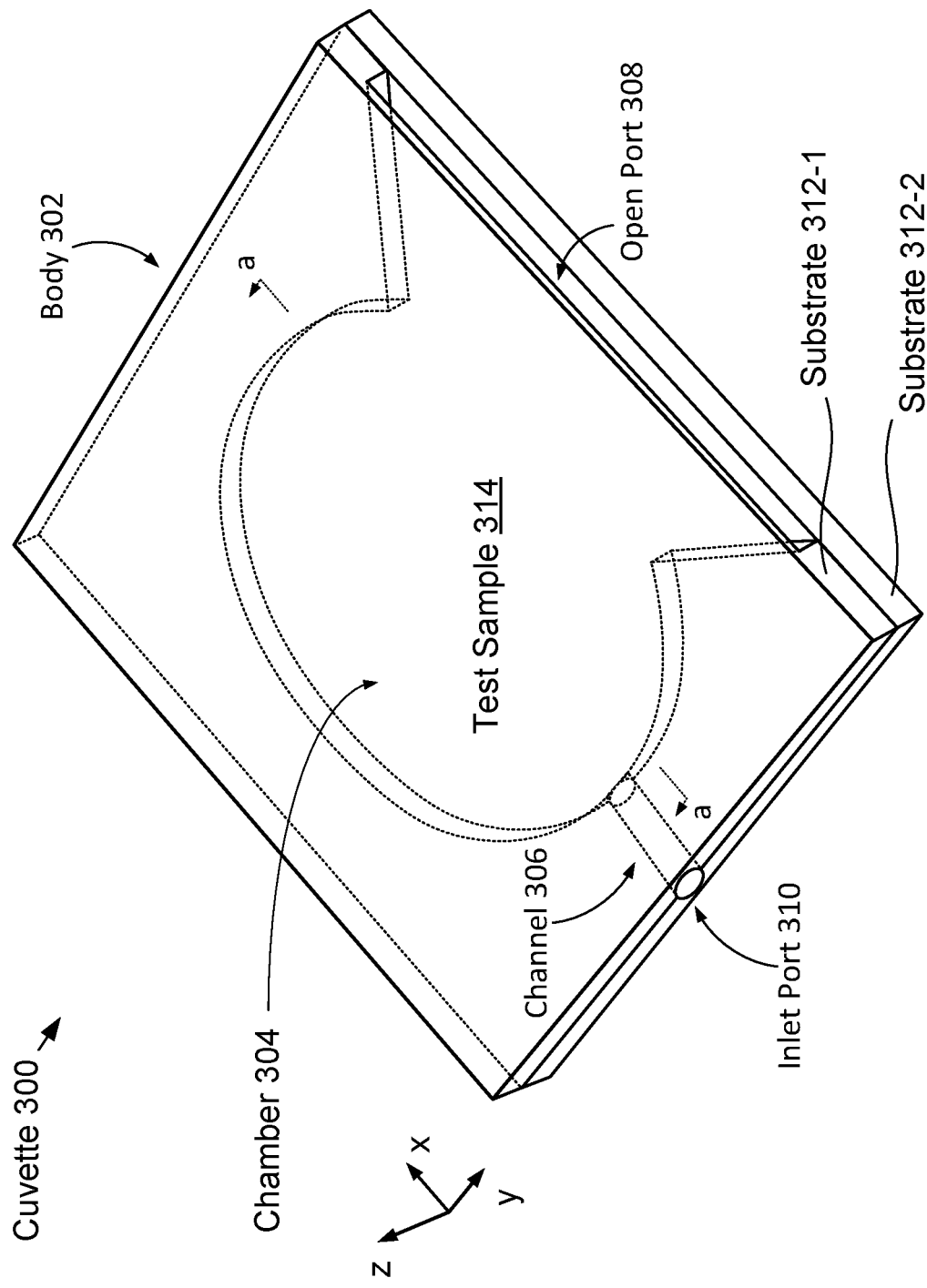

Embodiments in accordance with the present disclosure exploit the fact that geometric features formed at a surface can increase the absorption of radiation incident on that surface. As a result, less radiation is reflected at the interface between the surface and another medium due to a difference in their refractive indices.

Operating Principle

FIG. 1A depicts a schematic drawing of the transmission characteristics of a light signal incident on a flat interface between air and a silicon layer.

Layer 100A is a layer of single-crystal silicon having surface 102. Layer 100A is bounded by air, which has a refractive index, n1, of approximately 1.0, while the silicon of layer 100A has a refractive index, n2, of approximately 3.5.

When light signal 104 is incident upon the flat air/silicon interface defined by surface 102, a portion of its optical energy reflects and a portion of its optical energy passes into layer 100A, as dictated by the reflectivity of the interface.

As would be apparent to one skilled in the art, the reflectivity coefficient, r, for the light signal at the interface between the two materials is given by the formula:

$$r = \frac{(n2 - n1)}{(n2 + n1)}, \quad (1)$$

and the reflectivity and transmissivity at surface 102 is given as $r^2$ and $1-r^2$, respectively.

For a flat air/silicon interface, formula (1) shows that its reflectivity is approximately 31%; therefore, approximately 31% of the optical energy of light signal 104 reflects at surface 102 and only approximately 69% of the light signal passes through the flat air/silicon interface into layer 100A.

FIG. 1B depicts a schematic drawing of the transmission characteristics of a light signal incident on a non-flat interface between air and silicon where the interface comprises a geometric anti-reflection layer in accordance with the present disclosure.

Layer 100B includes layer 100A, as well as a geometric anti-reflection (GAR) layer 108 disposed on surface 102.

GAR layer 108 includes a plurality of features 110, which extend from plane P1 at surface 102 to plane P2 at boundary 112.

Features 110 are arranged in a two-dimensional arrangement on surface 102 with an inter-feature spacing, s1, that is smaller than the shortest wavelength included in light signal 104.

Features 112 are configured to realize a layer having a refractive index that slowly increases in substantially adiabatic fashion from a relatively lower effective refractive index, $n_e$, at boundary 112 to the refractive index of the material of surface 102. As a result, GAR layer 108 functions as a graded-index layer that serves to mitigate reflection of light signal 104 at the air/silicon interface.

FIG. 1C depicts a schematic drawing of a cross-sectional view of an exemplary feature 110 in accordance with the present disclosure.

In the depicted example, feature 110 is a silicon projection having height h1 and extending from base 114 at surface 106 to tip 116, thereby defining sidewall 118. It should be noted that the tips of features 110 collectively define boundary 112.

In the depicted example, sidewall 118 has a curved shape that gives rise to a cross-section for the feature that increases monotonically from a diameter of d1 at tip 116 to a diameter of d2 at base 114; however, as discussed below, feature 110 can have any of myriad shapes that mitigate reflection of light signal 104 without departing from the scope of the present disclosure. Furthermore, although features 110 and surface 102 comprise the same material in the depicted example, in some embodiments, features 110 are made of a different material than that at surface 102.

In the depicted example, geometric anti-reflection layers AR1 and AR2 are configured to provide broadband anti-reflection functionality that extends across the spectral range from approximately 2 microns to approximately 15 microns. Exemplary dimensions for feature 110, therefore, include h1 is approximately 5 microns, d1 is approximately 460 nm, d2 is approximately 1.8 microns, and s1 is approximately 2.0 microns. It should be noted that a wide range of dimensions and spacing of features 110 can be used to provide anti-reflection functionality for a light signal having a given spectral range without departing from the scope of the present disclosure.

Furthermore, as will be apparent to one skilled in the art after reading this Specification, suitable ranges of dimensions and spacings for the features of a geometric anti-reflection layer are dictated by the spectral range of the light signal for which it is intended to provide anti-reflection functionality.

It should be noted that geometric anti-reflection functionality can be achieved with a wide range of shapes for features 110.

FIGS. 2A-D depict schematic drawings of cross-sectional views of several non-limiting examples of feature shapes in accordance with the present disclosure.

Feature 110A is analogous to feature 110; however, feature 110A has a concave sidewall.

Feature 110B is analogous to feature 110; however, feature 110B has a substantially linear sidewall such that feature 110B is has a cone shape.

Feature 110C is analogous to feature 110B; however, feature 110C includes nanostructure 120, which serves to increase the surface area of sidewall 118C and improves the ability for features 110C to mitigate reflection of light signal 104. Nanostructure 120 can be formed via any conventional nano-structuring process, including, without limitation, electro-chemical etching, ion-assisted etching, and the like. It should be noted that nanostructure 120 can be included in any feature of a geometric anti-reflection layer without departing from the scope of the present disclosure.

Feature 110D is also analogous to feature 110; however, feature 110D is formed by etching into surface 102. It should be noted that the inverted structure of feature 110D results in surface 102 defining boundary 112, while the plurality of tips 116D in GAR layer 108 collectively define boundary 122. As a result, the effective refractive index of a geometric anti-reflection layer comprising features 110C adiabatically increases from $n_e$ to n2 along the z-direction from boundary 112 to boundary 122.

FIGS. 3A-B depict schematic drawings of simplified perspective and sectional views, respectively, of an illustrative embodiment of a cuvette in accordance with the present disclosure. Cuvette 300 includes body 302, chamber 304, optional channel 306, and optional open port 308. The sectional view of cuvette 300 depicted in FIG. 3B is taken through line a-a as shown in FIG. 3A. For clarity, geometric anti-reflection layers 108-1 through 108-4 are not shown in FIG. 3A.

Cuvette 300 is a sample holder operative for enabling optical interrogation of test sample 314 with interrogation signal 318. In the depicted example, test sample 314 is blood and interrogation signal 320 is a mid-infrared light signal having a spectral range centered at 8.5 microns and that spans the spectral range from approximately 2 microns to approximately 15 microns. It should be noted, however, that cuvettes in accordance with the present disclosure can be configured for use with a wide range of test samples (preferably liquid or liquid-like) and/or interrogation signals that span any suitable spectral range centered and/or have any suitable center wavelength.

Test sample 314 is loaded into chamber 304 via channel 306 and inlet port 310. In some embodiments, test sample 314 is loaded into chamber 304 in another conventional manner. For example, test sample 314 can be located in the chamber before substrates 312-1 and 312-2 are joined, etc.

Open port 308 is a channel that extends from chamber 304 to an edge of cuvette 300. Among other functions, open port 308 enables air to escape from chamber 304 as test sample 314 is loaded into it.

Figure 4:
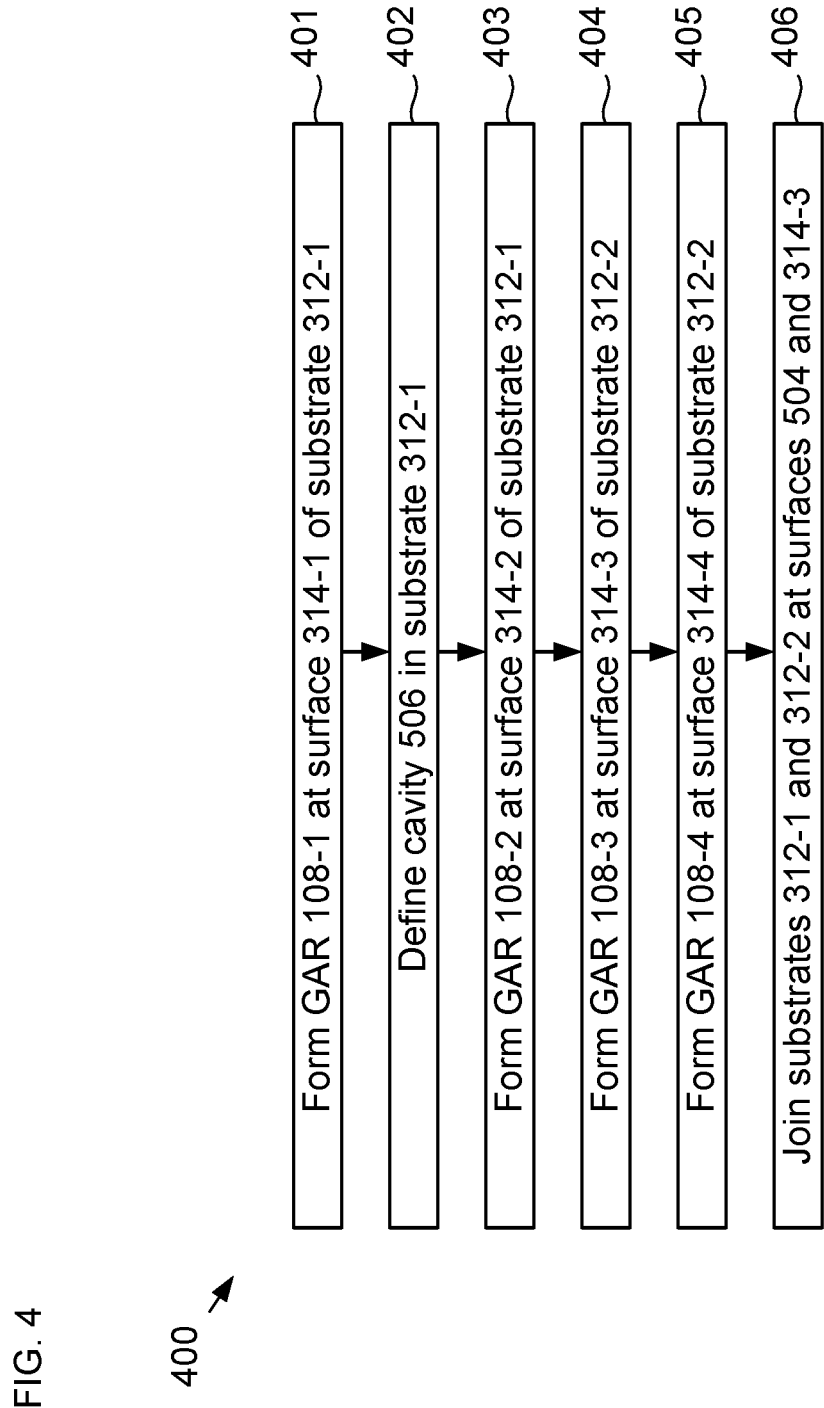
FIG. 4 depicts operations of a method suitable for forming a cuvette in accordance with the illustrative embodiment.

FIG. 4 depicts operations of a method suitable for forming a cuvette in accordance with the illustrative embodiment. Method 400 is described with continuing reference to FIGS. 2-3A-B, as well as reference to FIGS. 5A-C.

Method 400 begins with operation 401, wherein GAR layer 108-1 is formed at surface 314-1 of substrate 312-1.

In the depicted example, each of substrates 312-1 and 312-2 is a conventional single-crystal substrate. Prior to beginning method 400, substrate 312-1 has major surfaces 502 and 504 and substrate 312-2 has major surfaces 510 and 512.

In some embodiments, at least one of substrates 312-1 and 312-2 is made of a material other than single-crystal silicon. Materials suitable for use in one or both of substrates 312-1 and 312-2 include, without limitation, silicon, polysilicon, silicon compounds (e.g., silicon carbide, silicon germanium, etc.), compound semiconductors, glasses, silicon nitrides, silicon oxynitrides, ceramics, composite materials, and the like.

FIGS. 5A-C depict cross-sectional views of substrates 312-1 and 312-2 at different points in the formation of cuvette 300.

In the depicted example, GAR layer 108-1 is formed by defining a mask layer on major surface 502 of substrate 312-1. Once the mask layer is formed, a non-directional reactive-ion etch (RIE) is used to etch into substrate 312-1 at major surface 502 to define features 110. It should be noted that the formation of features 110 also forms surface 316-1 from which the features extend. Furthermore, since features 110 and surface 316-1 are formed by etching into substrate 312-1, which is a homogeneous single-crystal silicon substrate, features 110 and surface 316-1 also comprise single-crystal silicon.

In the depicted example, tips 116 are portions of major surface 502 that remain after definition of the features. As a result, plane P2-1 is co-located with the major surface of substrate 312-1. In some embodiments, features 110 are formed such that major surface 502 is completely removed.

It should be noted that subtractive patterning via photolithography and etching is merely one exemplary method for defining features 110 within the scope of the present disclosure. In some embodiments, features 110 are grown on surface 316-1 via a conventional deposition method, such as atomic-layer deposition (ALD), evaporation, sputtering, evaporative or sputtered deposition through a shadow mask, selective-area growth, and the like. Furthermore, by growing features 110, they can comprise a material that is different than the surface from which they extend. In such embodiments, surface 316-1 is typically major surface 502.

At operation 402, cavity 506 is defined in substrate 312-1. In the depicted example, cavity 506 is defined by forming a mask layer on outer surface 504 and etching into substrate 312-1 via a conventional etching technique, such as RIE, deep-RIE, crystallographic-dependent etching, and the like. The definition of cavity 506 defines intermediate surface 508.

FIG. 5A depicts a cross-sectional view of substrate 312-1 after the formation of GAR layer 108-1 and cavity 506.

It should be noted that the order in which GAR layer 108-1 and cavity 506 are formed can be reversed.

At operation 403, GAR layer 108-2 is formed at surface 314-2 of substrate 312-1. GAR layer 108-2 is formed by defining features 110 and surface 316-2 by etching into substrate 312-1 at intermediate surface 508, as described above and with respect to the formation of GAR layer 108-1. It should be noted that, typically, GAR layer 108-1 is protected with a layer of photoresist or other suitable protective layer during operation 403.

FIG. 5B depicts a cross-sectional view of substrate 312-1 after the formation of GAR layer 108-2 at surface 314-2.

At operation 404, GAR layer 108-3 is formed at surface 316-3 of substrate 312-2. GAR layer 108-3 is formed by defining features 110 and surface 316-3 by etching into substrate 312-2 at major surface 510, as described above and with respect to the formation of GAR layer 108-1.

At operation 405, GAR layer 108-4 is formed at surface 316-4 of substrate 312-2. GAR layer 108-4 is formed by defining features 110 and surface 316-4 by etching into substrate 312-2 at major surface 512, as described above.

FIG. 5C depicts a cross-sectional view of substrate 312-2 after the formation of GAR layers 108-3 and 108-4.

At operation 406, substrates 312-1 and 312-2 are joined by bonding major surface 504 and surface 314-3. In the depicted example, the surfaces are joined via oxygen-plasma-assisted bonding; however, myriad alternative bonding methods, such as fusion bonding, thermo-anodic bonding, gluing, soldering, and the like, can be used without departing from the scope of the present disclosure.

Figures 6A, 6B:
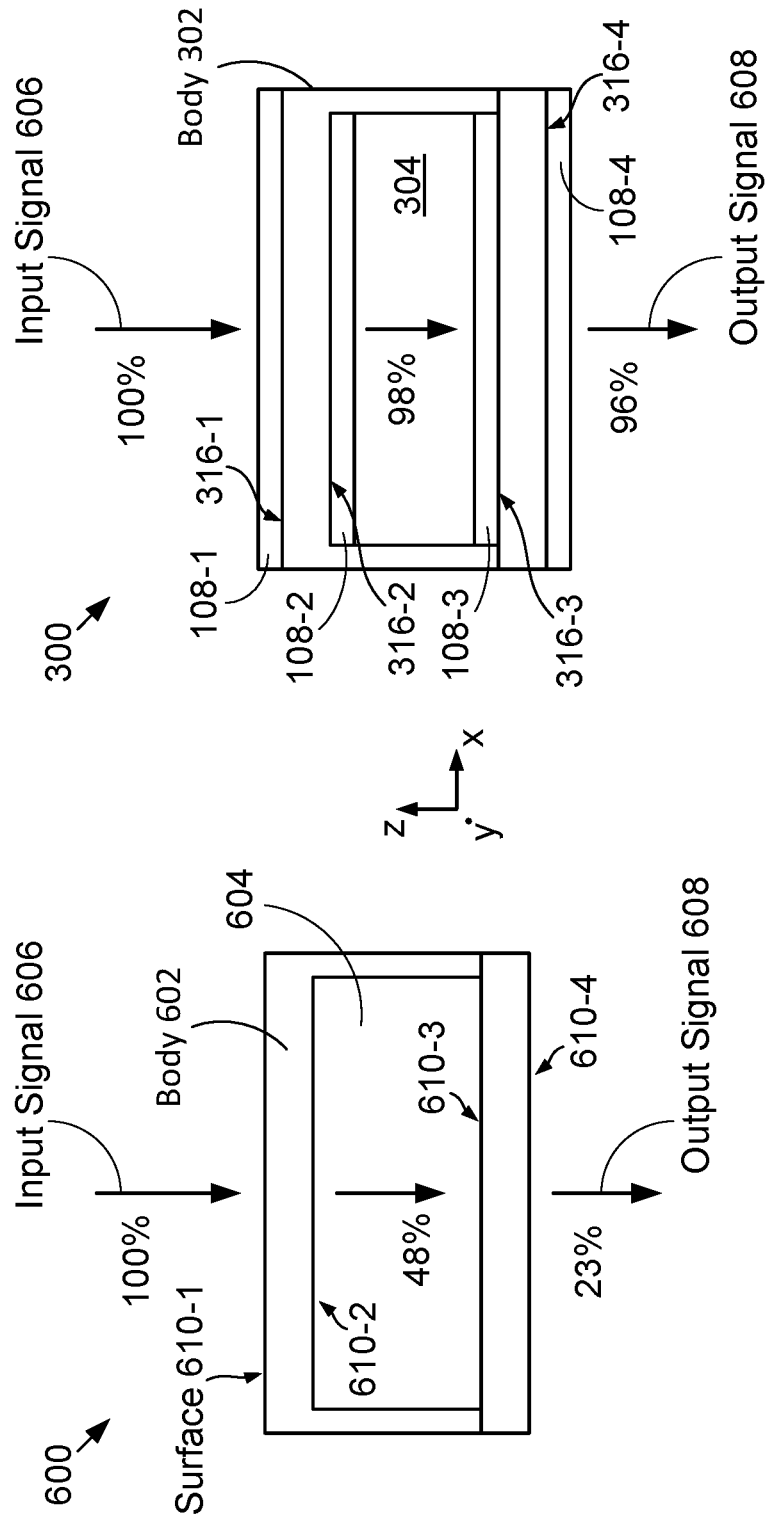
FIGS. 6A-B depict a comparison of the transmission of an input signal through a prior-art cuvette and a cuvette in accordance with the present disclosure, respectively.

FIGS. 6A-B depict a comparison of the transmission of an input signal through a prior-art cuvette and a cuvette in accordance with the present disclosure, respectively.

Cuvette 600 is a prior-art cuvette comprising body 602 and chamber 604. Cuvette 600 is structurally analogous to cuvette 300; however, cuvette 600 does not include GAR layers at surfaces 610-1 through 610-4, each of which is a flat surface of body 602 through which input signal 606 passes. It should be noted that, for the sake of comparison, no test sample is included in either of chambers 604 and 304.

As discussed above and with respect to FIG. 1A, each of surfaces 610-1 through 610-4 defines a flat air/silicon interface having a reflectivity of approximately 31%. As a result, due to reflections at each of surfaces 610-1 and 610-2, only approximately 48% of the optical energy of input signal 606 reaches chamber 604. In similar fashion, as the input signal passes through the remainder of body 602, additional reflections at surfaces 610-3 and 610-4 further reduce the optical energy in the light such that output signal 608 contains only 23% of the optical energy of input signal 606.

In contrast, each of surfaces 316-1 through 316-4 includes a GAR layer 108 such that the combination of each GAR layer and its respective surface is collectively characterized by a reflectivity of only approximately 1%. As a result, approximately 98% of the optical energy of input signal 606 reaches chamber 304 of cuvette 300 through surfaces 316-1 and 316-2 and their respective GAR layers 108-1 and 108-2, and only another approximately 2% is lost passing back out of body 302 through surfaces 316-3 and 316-4 and their respective GAR layers 108-3 and 108-4. As a result, output signal 608 contains approximately 96% of the optical energy of input signal 606.

It is clear, therefore, that the addition of geometric anti-reflection layers at each surface of a cuvette through which an interrogation signal passes can realize a greater than 4× improvement in the strength of the output signal.

It should be noted that, while the illustrative embodiment is a low-reflectivity cuvette for holding a test sample, the concepts of the present disclosure can be used to reduce the reflectivity of a surface of a wide range of elements other than a sample cuvette, such as optical elements (e.g., lenses, prisms, etc.). The inclusion of a geometric anti-reflection layer on a preferably high-transmissive surface is particularly advantageous for elements made of high-refractive-index materials, such as silicon, etc.

Figure 7A:
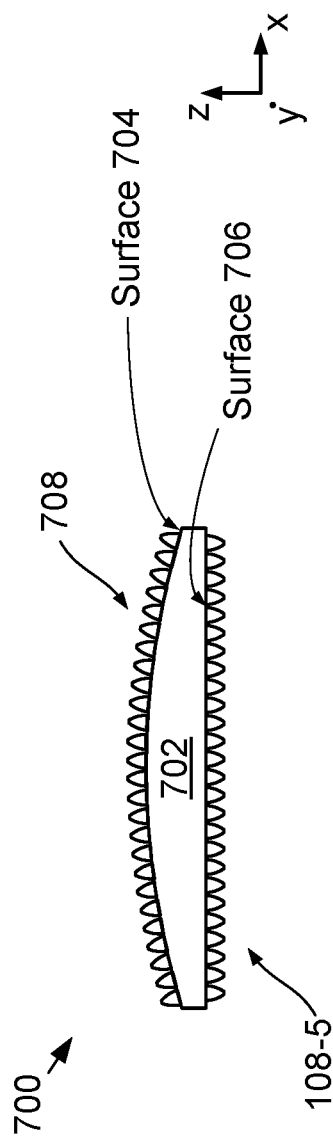
FIGS. 7A-B depict schematic drawings of cross-sectional views of a plano-convex lens and a prism, respectively, that include geometric anti-reflection layers in accordance with the present disclosure.
Figure 7B:
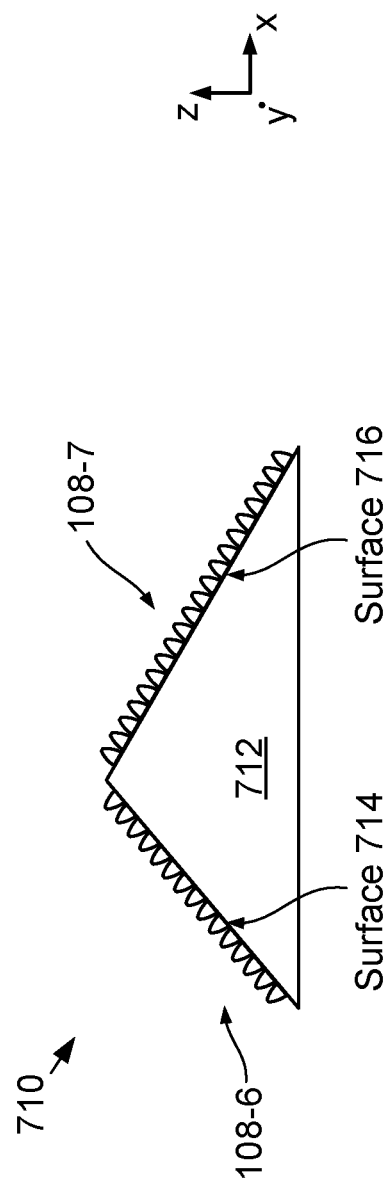

FIGS. 7A-B depict schematic drawings of cross-sectional views of a plano-convex lens and a prism, respectively, having geometric anti-reflection layers in accordance with the present disclosure.

Lens 700 includes lens body 702, GAR layer 108-5, and GAR layer 708.

Lens body 702 has the shape of a conventional plano-convex lens and includes convex surface 704 and planar surface 706. Lens body 702 is made of single-crystal silicon; however, other materials can be used for lens body 702 without departing from the scope of the present disclosure.

GAR layer 108-5 is disposed on planar surface 704 to realize a low-reflectivity, planar air/silicon interface as described above and with respect to FIG. 1B.

GAR layer 708 is analogous to GAR layer 108-5; however, GAR layer 708 is disposed on a curved surface to realize a low-reflectivity, curved air/silicon interface.

In similar fashion, prism 710 includes prism body 712 and GAR layers 108-6 and 108-7.

Prims body 712 is characterized by a conventional prism shape and is made of single-crystal silicon.

GAR layers 108-6 and 108-7 are disposed on surfaces 714 and 716, respectively, to realize low-reflectivity, planar air/silicon interfaces as described above and with respect to FIG. 1B.

It should be noted that lens 700 and prism 710 are merely examples of low-reflectivity transmissive elements that can include one or more GAR layers and myriad alternative elements are within the scope of the present disclosure.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An optical element comprising a body having:
   a first wall having a first surface that defines a first plane and a second surface that defines a second plane, wherein the first surface comprises a first material;
   a second wall having a third surface that defines a third plane and a fourth surface that defines a fourth plane; and
   a first plurality of features that collectively define a first geometric anti-reflection layer, each feature extending from a first base at the first plane to a tip;
   wherein the second surface and third surface define at least a portion of a chamber for holding a test sample;
   wherein a flat surface comprising the first material is characterized by a first reflectivity for a first light signal; and
   wherein the first geometric anti-reflection layer and the first surface are collectively characterized by a second reflectivity for the first light signal that is lower than the first reflectivity.

2. The optical element of claim 1 further comprising a second plurality of features that collectively define a second geometric anti-reflection layer, each feature of the second plurality thereof extending from a second base at the fourth plane to a second end, wherein the second surface comprises a second material, and wherein a flat surface comprising the second material is characterized by a third reflectivity for the first light signal, and further wherein the second geometric anti-reflection layer and the fourth surface are collectively characterized by a fourth reflectivity for the first light signal that is lower than the third reflectivity.

3. The optical element of claim 2 wherein the first material and second material are the same material.

4. The optical element of claim 1 wherein the first material is silicon.

5. The optical element of claim 1 wherein each feature of the first plurality thereof comprises the first material.

6. The optical element of claim 1 wherein each feature of the first plurality thereof has a sidewall that extends between the first base and the tip, and wherein at least one sidewall of the first plurality thereof includes a surface feature.

7. The optical element of claim 1 further comprising:
   a second plurality of features that collectively define a second geometric anti-reflection layer, each feature of the second plurality thereof extending from a second base at the second plane to a second end, wherein the second surface comprises the first material, and wherein the second geometric anti-reflection layer and the second surface are collectively characterized by a third reflectivity for the first light signal that is lower than the first reflectivity; and
   a third plurality of features that collectively define a third geometric anti-reflection layer, each feature of the third plurality thereof extending from a third base at the third plane to a third end, wherein the third surface comprises the first material, and wherein the third geometric anti-reflection layer and the third surface are collectively characterized by a fourth reflectivity for the first light signal that is lower than the first reflectivity.

8. The optical element of claim 7 further comprising a fourth plurality of features that collectively define a fourth geometric anti-reflection layer, each feature of the fourth plurality thereof extending from a fourth base at the fourth plane to a fourth end, wherein the fourth surface comprises the first material, and wherein the fourth geometric anti-reflection layer and the fourth surface are collectively characterized by a fifth reflectivity for the first light signal that is lower than the first reflectivity.

9. The optical element of claim 1 wherein each feature of the first plurality thereof has a cross-section having a lateral dimension that increases monotonically from its tip to its first base.

10. The optical element of claim 9 wherein the monotonic increase is linear.

11. The optical element of claim 1 wherein the first light signal is characterized by a spectral range that extends from a first wavelength to a second wavelength, the first wavelength being shorter than the second wavelength, and wherein the features of the first plurality thereof are separated by an average spacing that is less than the first wavelength.

12. The optical element of claim 11 wherein the first wavelength is 2 microns and the second wavelength is 15 microns.

13. An optical element comprising a body that includes a chamber for holding a test sample, wherein the body comprises:
   a first wall having a first surface that defines a first plane and a second surface that defines a second plane, wherein each of the first and second surfaces comprises a first material and has a first reflectivity for a first light signal;
   a second wall having a third surface that defines a third plane and a fourth surface that defines a fourth plane, wherein each of the third surface and fourth surface comprises the first material;
   a first plurality of features that collectively define a first geometric anti-reflection layer, each feature extending from a first base at the first plane to a tip;
   a second plurality of features that collectively define a second geometric anti-reflection layer, each feature of the second plurality thereof extending from a second base at the second plane to a second tip;
   a third plurality of features that collectively define a third geometric anti-reflection layer, each feature of the third plurality thereof extending from a third base at the third plane to a third tip; and
   a fourth plurality of features that collectively define a fourth geometric anti-reflection layer, each feature of the fourth plurality thereof extending from a fourth base at the fourth plane to a fourth tip;
   wherein the first geometric anti-reflection layer and the first surface are collectively characterized by a second reflectivity for the first light signal, the second geometric anti-reflection layer and the second surface are collectively characterized by a third reflectivity for the first light signal, the third geometric anti-reflection layer and the third surface are collectively characterized by a fourth reflectivity for the first light signal, and the fourth geometric anti-reflection layer and the fourth surface are collectively characterized by a fifth reflectivity for the first light signal;
   wherein each of the second, third, fourth, and fifth reflectivities is lower than the first reflectivity; and
   wherein the second surface and third surface define at least a portion of the chamber.

14. The optical element of claim 13 wherein the features of each of the first, second, third, and fourth pluralities comprise the first material.

15. The optical element of claim 14 wherein the first material is silicon and the first light signal spans a spectral width that includes at least a portion of the mid-infrared spectral range.

16. A method for forming an optical element, the method comprising:
providing a first substrate having a first surface that defines a first plane and a second surface that defines a second plane;
providing a second substrate having a third surface that defines a third plane and a fourth surface that defines a fourth plane;
forming a first geometric anti-reflection layer that includes a first plurality of features disposed on the first surface such that each of the first plurality of features extends from a first base at the first plane to a tip, wherein the first surface comprises a first material, and wherein a flat surface comprising the first material is characterized by a first reflectivity for a first light signal, and further wherein the first geometric anti-reflection layer and the first surface are collectively characterized by a second reflectivity for the first light signal that is lower than the first reflectivity; and
arranging the first substrate and a second substrate such that a second surface and a third surface collectively define at least a portion of a chamber for holding a test sample.

17. The method of claim 16 further comprising forming a first cavity in one of the first and second substrates, wherein the first cavity includes one of the second and third surfaces, and wherein the first and second substrates are arranged by joining the first substrate and second substrate such that the chamber includes the first cavity.

18. The method of claim 16 further comprising:
forming a second geometric anti-reflection layer that includes a second plurality of features that are disposed on the fourth surface, each of the second plurality of features extending from a second base at the fourth plane to a second end, wherein the fourth surface comprises a second material, and wherein a flat surface comprising the second material is characterized by a third reflectivity for the first light signal, and wherein the second geometric anti-reflection layer and the fourth surface are collectively characterized by a fourth reflectivity for the first light signal that is lower than the second reflectivity.

19. The cuvette of claim 16 wherein each feature of the first plurality thereof has a cross-section having a lateral dimension that increases monotonically from its tip to its first base.

20. The cuvette of claim 19 wherein the monotonic increase is linear.

21. The method of claim 16 further comprising:
forming a second geometric anti-reflection layer that includes a second plurality of features disposed on the second surface, each of the second plurality of features extending from a second base at the second plane to a second end, wherein the second surface comprises the first material and the second geometric anti-reflection layer and the second surface are collectively characterized by a third reflectivity for the first light signal that is lower than the first reflectivity; and
forming a third geometric anti-reflection layer that includes a third plurality of features disposed on the third surface, each of the third plurality of features extending from a third base at the third plane to a third end, wherein the third surface comprises the first material and the third geometric anti-reflection layer and the third surface are collectively characterized by a fourth reflectivity for the first light signal that is lower than the first reflectivity.

22. The method of claim 21 further comprising:
forming a fourth geometric anti-reflection layer that includes a fourth plurality of features disposed on the fourth surface, each of the fourth plurality of features extending from a fourth base at the fourth plane to a fourth end, wherein the fourth surface comprises the first material, and wherein the fourth geometric anti-reflection layer and the fourth surface are collectively characterized by a fifth reflectivity for the first light signal that is lower than the second reflectivity.

23. The method of claim 22 wherein each of the first, second, third, and fourth plurality of features comprises the first material.

24. The method of claim 16 wherein the first light signal is characterized by a spectral range that extends from a first wavelength to a second wavelength, the first wavelength being shorter than the second wavelength, and wherein the features of the first plurality thereof are separated by an average spacing that is less than the first wavelength.

25. The method of claim 24 wherein the first wavelength is 2 microns and the second wavelength is 15 microns.

* * * * *